(12) United States Patent
Almansour et al.

(10) Patent No.: US 11,952,496 B1
(45) Date of Patent: Apr. 9, 2024

(54) LIQUID AND SOLID STATE LASER FROM 7H-PYRANO[2,3-B:4,5-B']DIQUINOLINE DERIVATIVES USING ENERGY TRANSFER MECHANISM

(71) Applicants: Abdulrahman I Almansour, Riyad (SA); Saradh Prasad Rajendra, Riyadh (SA); Mohamad Saleh Alsalhi, Riyadh (SA); Natarajan Arumugam, Riyadh (SA); Raju Suresh Kumar, Riyadh (SA)

(72) Inventors: Abdulrahman I Almansour, Riyad (SA); Saradh Prasad Rajendra, Riyadh (SA); Mohamad Saleh Alsalhi, Riyadh (SA); Natarajan Arumugam, Riyadh (SA); Raju Suresh Kumar, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/142,432

(22) Filed: May 2, 2023

(51) Int. Cl.
| | | |
|---|---|---|
| *C09B 25/00* | (2006.01) | |
| *H01S 3/094* | (2006.01) | |
| *H01S 3/16* | (2006.01) | |
| *H01S 3/213* | (2006.01) | |

(52) U.S. Cl.
CPC ........ *C09B 25/00* (2013.01); *H01S 3/094034* (2013.01); *H01S 3/168* (2013.01); *H01S 3/213* (2013.01)

(58) Field of Classification Search
CPC ... C09B 25/00; H01S 3/094034; H01S 3/168; H01S 3/213
See application file for complete search history.

(56) References Cited

U.S. PATENT DOCUMENTS

2014/0294032 A1   10/2014   Yoshioka et al.

FOREIGN PATENT DOCUMENTS

| CN | 111253202 A | 6/2020 |
|---|---|---|
| EP | 3054498 | 8/2016 |

OTHER PUBLICATIONS

Osborne, Magnetic resonance in Chemistry, vol. 27, 4-12, 1989. (Year: 1989).*

* cited by examiner

*Primary Examiner* — D Margaret M Seaman
(74) *Attorney, Agent, or Firm* — Nath, Goldberg & Meyer; Richard C. Litman

(57) ABSTRACT

The present subject matter relates to a new liquid and solid-state laser system comprising a laser structure and novel 7H-pyrano[2,3-b:4,5-b']diquinoline derivative compounds as the laser active media; the novel 7H-pyrano[2,3-b:4,5-b']diquinoline derivative compounds comprising 10-chloro-7H-pyrano[2,3-b:4,5-b']diquinoline [(Cl-PD)] and 10-methoxy-7H-pyrano[2,3-b:4,5-b']diquinoline [(MeO-PD)]; and a method of synthesizing the organic 7H-pyrano[2,3-b:4,5-b']diquinoline derivative compounds used in the laser system.

6 Claims, 10 Drawing Sheets

LIQUID AND SOLID STATE LASER FROM 7H-PYRANO[2,3-B:4,5-B']DIQUINOLINE DERIVATIVES USING ENERGY TRANSFER MECHANISM

BACKGROUND

1. Field

The disclosure of the present application relates to a liquid and solid-state laser system based on organic molecules as a liquid state matrix and a solid-state matrix, and particularly to an energy transfer between organic pyranodiquinoline derivatives to produce an amplified spontaneous emission (ASE) laser, and random laser (RL).

2. Description of the Related Art

The discovery of certain types of organic compounds is exciting in basic and applied research, communication, pharmacology, construction, medical, and military applications. Organic molecules have also been used in biosensors, sensors, light-harvesting, memory devices, bioimaging, and catalysis. Most importantly, it has a wide range of applications in optoelectronics, including organic photovoltaics (OPVs), organic field-effect transistors (FETs), organic light-emitting diodes (OLEDs), organic thin-film transistors (OTFT), non-linear optical devices, and lasers. OLEDs are commonly utilized in flexible displays, televisions, storage devices, solar systems, and other portable devices as a surface light source. Certain organic materials are easy to create and have high energy efficiency. Organic materials have made substantial contributions to the development of dyes as laser materials and have proven to be a suitable media for laser action with continuous tunability from 350 to 900 nm. Ar ion/Kr ion gas lasers have also been used to pump the dyes in continuous wave (CW) mode. The ability to work in amplified spontaneous emission (ASE) mode and to create picosecond and femtosecond pulses with an appropriate mode-locking design are two other key features of these dyes. Dye lasers are essential instruments in basic and applied sciences, such as cancer treatment (e.g., photodynamic therapy).

Lasers are currently applied in almost all places; high-power lasers are widely used in many fields such as industrial, military, and medical fields. The most commonly used lasers are Nd:YAG, Nd:glass, Ti-sapphire and Er:doped fiber lasers; but they are very bulky, expensive, labor-intensive, and require very high maintenance.

Despite the fact that organic dye lasers have been studied in gas, liquid, and solid-state phases, these lasers always function best in the liquid state because the heat generated by the laser process can be quickly dissipated by a rapid flow of the dye solution. The dye must flow as a narrow jet due to the CW laser activity limitation. Because of their planar geometry with extended conjugation and extremely fluorescent nature, rhodamine 6G (a highly fluorescent rhodamine family dye) and pyrromethene complex have been employed as solid-state dye laser materials for decades. These dyes are more photochemically stable to endure a few hundred thousand laser shots and have better lasing capacity because they have heteroatoms in rings such as oxygen and nitrogen and are soluble in polar organic and water-soluble solvents. However, the toxicity and flammability of certain dyes and the necessity for vast amounts of organic solvents are practical drawbacks of liquid dye laser systems. Furthermore, dye lasers are difficult to transport for field investigations.

Therefore, low cost, non-toxic, easy-to-maintain, easy to transport, plug-and-play lasers would be desirable to produce.

SUMMARY

In order to find an alternative to lasers using such dyes as rhodamine and coumarin derivatives, conjugated molecules have been proposed as a potential new type of laser material since conjugated molecules should exhibit better photochemical stability than conventional dye solutions. Conjugated molecules contain alternating C=C double bonds (typically one σ-bond and one σ-bond) and C—C single bonds (σ-bonds). This alternation of single and double bonds determines the opening of the band gap due to the Peierls distortion and explains why conjugated molecules in their neutral state are mostly semiconductors and not metals. As a result of the oscillation of the π-electrons, electromagnetic radiation is absorbed. The process is similar to what occurs during the photosynthesis process in plants. For example, a molecule with only one conjugated double bond will absorb only ultraviolet light. With additional conjugated double bonds, a molecule will be able to absorb different wavelengths of visible light. The π-electrons are therefore responsible for determining the electrical and chemical properties.

New lasers may also be designed using other organic molecules to cover other wavelength regions of the visible spectrum. Further, the laser is only one application, and this technology could be extended to other devices such as OLED, a phosphors layer in existing LED devices, sensors, and other optoelectronic devices.

The presently disclosed subject matter relates to a liquid and solid-state laser system using organic 7H-pyrano[2,3-b:4,5-b']diquinoline derivatives, the organic 7H-Pyrano[2,3-b:4,5-b']diquinoline derivatives, and a method of synthesizing the organic 7H-Pyrano[2,3-b:4,5-b']diquinoline derivatives used in the present laser systems. The liquid and solid-state laser system is based on the organic 7H-pyrano [2,3-b:4,5-b']diquinoline derivatives using an energy transfer mechanism, with the energy transfer mechanism between the organic pyranodiquinoline derivatives producing an amplified spontaneous emission (ASE) laser and random laser (RL). The laser system specifically employs the novel and efficient 10-methoxy-7H-pyrano[2,3-b:4,5-b']diquinoline [(MeO-PD)] as an acceptor and 10-chloro-7H-pyrano [2,3-b:4,5-b']diquinoline [(Cl-PD)] as a donor, and a Förster resonance energy transfer (FRET) mechanism to produce the amplified spontaneous emission (ASE) and the random laser (RL) in liquid and solid-state matrices based on biodegradable polycaprolactone. The organic 7H-pyrano[2,3-b:4,5-b']diquinoline derivatives (pyranodiquinoline derivatives) can be synthesized in three steps employing an intramolecular Povarov reaction. Each of the derivatives can have unique optical properties and can be chosen as constituents of active laser materials, as well as being efficient and low-cost.

In one embodiment, the present subject matter relates to a liquid and solid-state laser system comprising a laser structure and organic pyranodiquinoline derivatives 10-methoxy-7H-pyrano[2,3-b:4,5-b']diquinoline [(MeO-PD)] and 10-chloro-7H-pyrano[2,3-b:4,5-b']diquinoline [(Cl-PD)] employed in an energy transfer mechanism.

In an embodiment, the present subject matter relates to organic 7H-Pyrano[2,3-B:4,5-B']diquinoline derivative compounds selected from the group consisting of 10-chloro-7H-pyrano[2,3-b:4,5-b']diquinoline [(Cl-PD)] and 10-methoxy-7H-pyrano[2,3-b:4,5-b']diquinoline [(MeO-PD)] having the following respective structures:

In an embodiment, the present subject matter relates to a method of synthesizing organic 7H-pyrano[2,3-b:4,5-b']diquinoline derivative compounds, the method comprising: adding 2-hydroxyquinoline-3-carbaldehyde to propargyl bromide in the presence of sodium hydroxide in n-propanol to produce 2-(prop-2-yn-1-yloxy)quinoline-3-carbaldehyde; reacting the 2-(prop-2-yn-1-yloxy)quinoline-3-carbaldehyde with an arylimine in $CH_2Cl_2$ to produce a corresponding 2-(prop-2-yn-1-yloxy)quinolin-3-arylimine; and treating the corresponding 2-(prop-2-yn-1-yloxy)quinolin-3-arylimine with about 20 mol % of boron trifluoride diethyl etherate ($BF_3O(C_2H_5)_2$) in 1,2-dichloroethane to produce the organic 7H-pyrano[2,3-b:4,5-b']diquinoline derivative compounds.

These and other features of the present application subject matter will become readily apparent upon further review of the following specification.

DETAILED DESCRIPTION OF THE PREFERRED EMBODIMENTS

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

As used herein, the phrases "liquid and solid-state laser system" and "laser system", and the like can be used interchangeably, one to the other, to refer to the same thing, whether in the singular or the plural. The same applies to the abbreviations "PD" and "ODAPP" with reference to e.g., Cl-PD and MeO-PD, and "cl" is interchangeable with "Cl", both representing chlorine. 10-chloro-7H-pyrano[2,3-b:4,5-H]diquinoline [(Cl-PD)] and 10-methoxy-7H-pyrano[2,3-b:4,5-b']diquinoline [(MeO-PD)] are the same compounds as 10-chloro-7H-6-oxa-5,13-diazapentaphene [(Cl-ODAPP) and 10-methoxy-7H-6-oxa-5,13-diazapentaphene [(MeO-ODAPP), respectively.

In one embodiment, the present subject matter relates to a liquid and solid-state laser system comprising a laser structure and organic pyranodiquinoline derivatives 10-methoxy-7H-pyrano[2,3-b:4,5-b']diquinoline [(MeO-PD)] and 10-chloro-7H-pyrano[2,3-b:4,5-b']diquinoline [(Cl-PD)] as the laser active media (AM) using an energy transfer mechanism or process.

In this regards, the present laser system can use an energy transfer mechanism, with the energy transfer between the organic pyranodiquinoline derivatives producing an amplified spontaneous emission (ASE) laser and random laser (RL). The laser system specifically uses, as the organic pyranodiquinoline derivatives, the Cl-PD (donor) and the MeO-PD (acceptor) as the active media embedded in liquid (toluene) or solid-state (polycaprolactone (PCL) matrix) media to form liquid or solid active media (AM) for the energy transfer.

The present laser system is designed to produce an output laser beam having a single wavelength at about 468 nm for the ASE or a broadband RL spike from about 425 nm to about 475 nm for the RL active media (AM). A Förster resonance energy transfer (FRET) mechanism is used to produce the amplified spontaneous emission (ASE), and the random laser (RL) in liquid and solid-state matrices based on the biodegradable polycaprolactone (PCL).

The present laser system can produce a mirrorless laser [Amplified spontaneous emission (ASE)] in a single pass and cavity-based liquid laser design. In the polycaprolactone (PCL) solid-state matrix-based laser design, the random laser is produced using active media (Cl-PD and MeO-PD). The random laser (RL) is made possible by mesoscopic optical gain caused by synergic scattering on a nanostructure's surface. This laser can offer a wide range of applications because of its ease of construction.

The liquid laser (LL) is designed using toluene to dissolve the Cl-PD/MeO-PD. The solid-state laser (SSL) is designed using polycaprolactone (PCL) to embed the Cl-PD/MeO-PD mixture. The LL can produce a strong ASE and laser at about 468 nm with a full width half maximum (FWHM) of 4 nm and 1.2 nm for pump energy of 20 mJ/cm$^2$ and 10 mJ/cm$^2$ in mirrorless and cavity mode configuration, respectively. The SSL can produce a random laser (RL) with multiple spikes in a broad band from 425 nm to 475 nm; the spikes can be very sharp and have a FWHM of less than 0.4 nm. The laser-induced fluorescence (LIF) can change to a RL at about the threshold pump energy of 30 mJ/cm$^2$. The single spikes may be in an isolated grating arrangement.

Figure 1A:
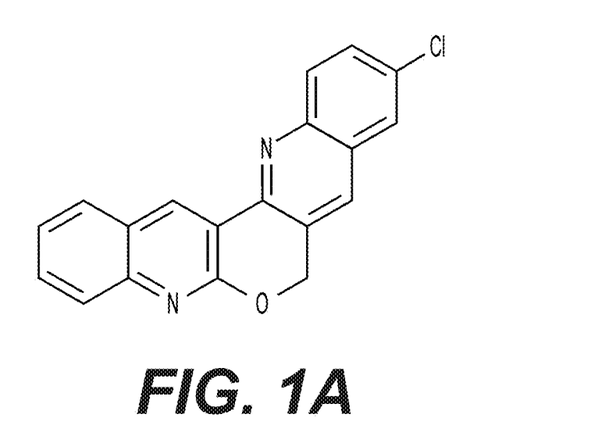
FIG. 1A shows the molecular structure of 10-chloro-7H-6-oxa-5,13-diazapentaphene [(Cl-ODAPP)].
Figure 1B:
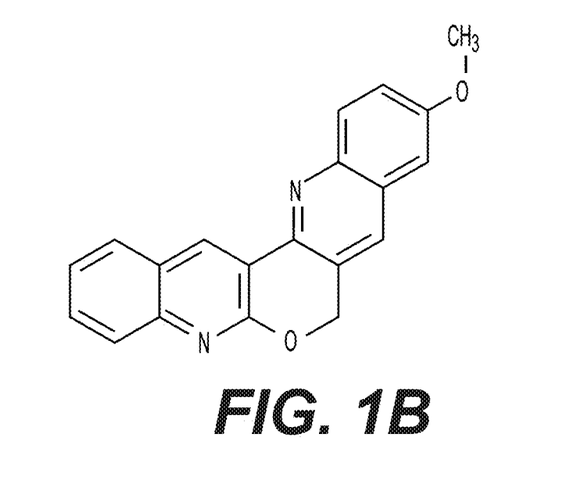
FIG. 1B shows the molecular structure of 10-methoxy-7H-6-oxa-5,13-diazapentaphene [(MeO-ODAPP)].
Figure 1C:
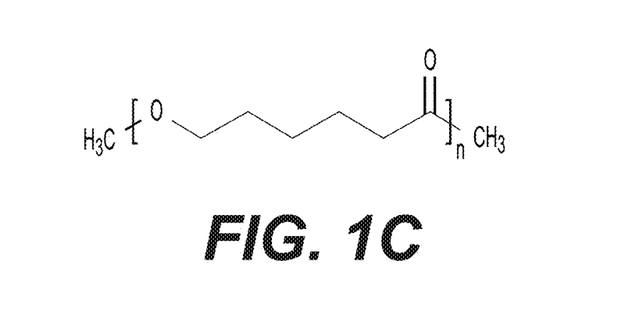
FIG. 1C shows the molecular structure of polycaprolactone (PCL), used as a solid state matrix.
Figure 4A:
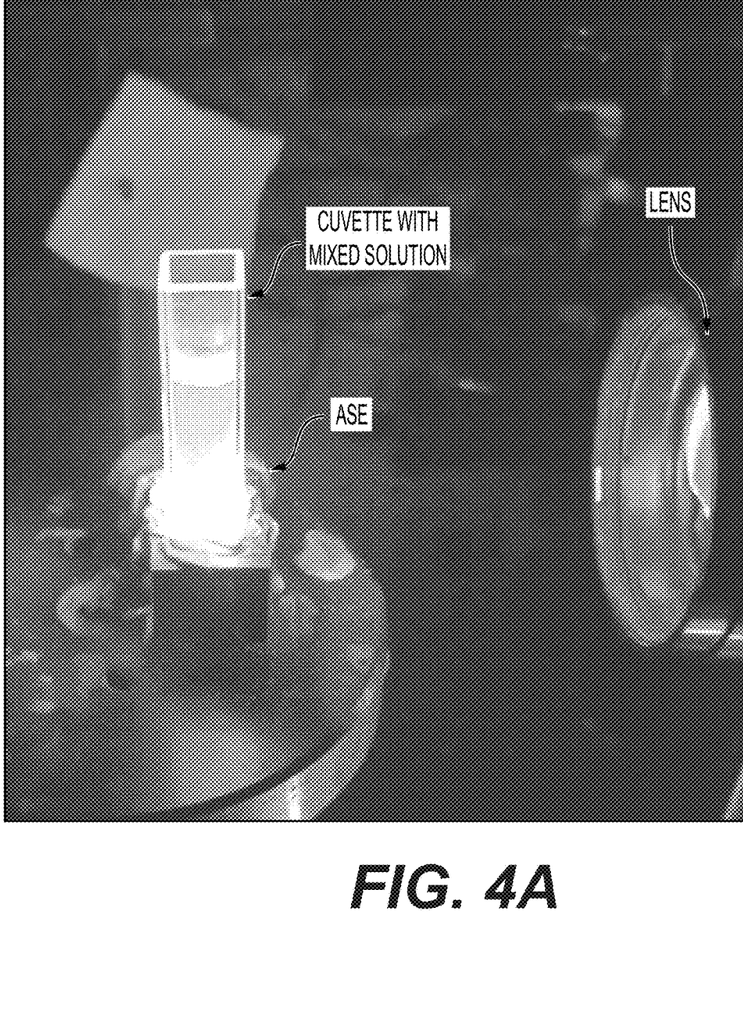
FIG. 4A shows the liquid active media (LSAM or LAM).
Figure 4B:
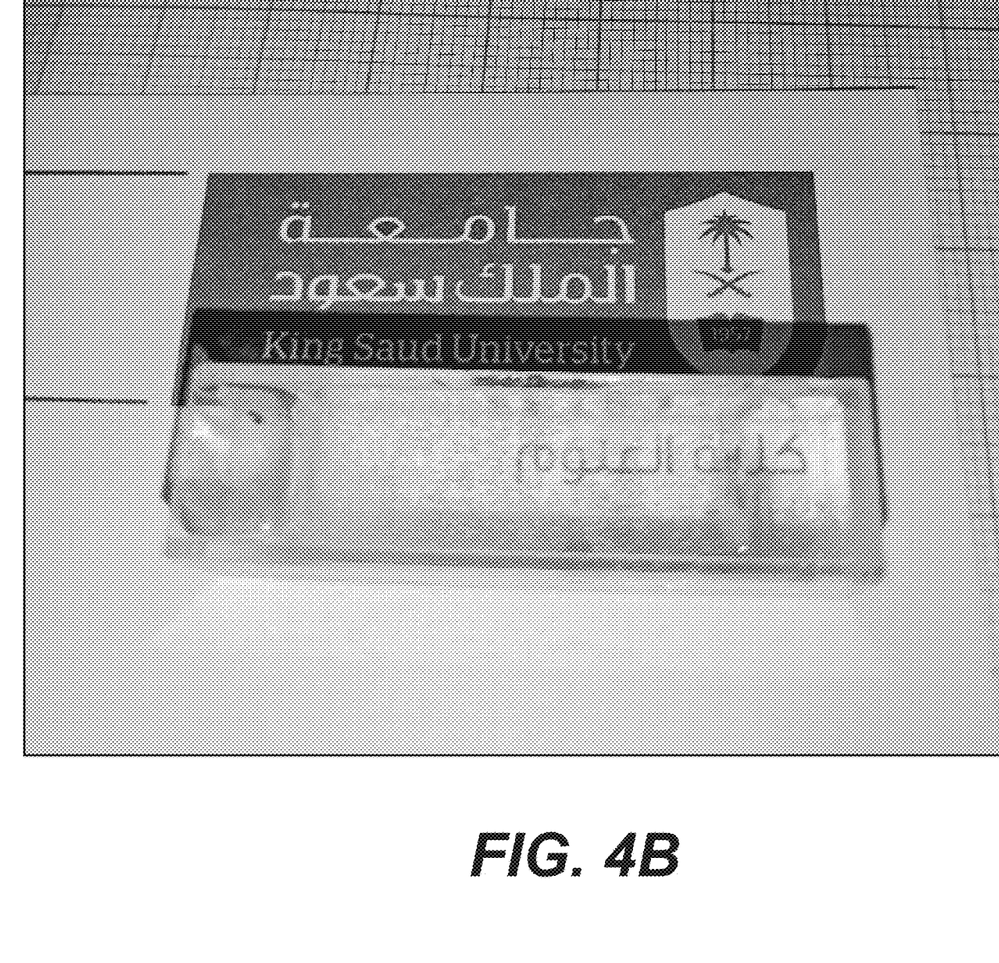
FIG. 4B shows the solid-state active media (SSAM or SAM).

In one embodiment, it is possible to construct the laser system using 3 mg of Cl-PD (molecular structure shown in FIG. 1A) and 6 mg of MeO-PD (molecular structure as shown in FIG. 1A), which are dissolved in 4 ml of toluene and kept in a cuvette, which forms the liquid active media (LAM or LM) as shown in FIG. 4A (where the LAM can be replaced with SSAM (SAM or SM)). The solid media (SM) can be formed by mixing 10 g of PCL (molecular structure of PCL shown in FIG. 1C), 4 mg of Cl-PD, and 8 mg of MeO-PD in 5 ml of toluene under constant stirring to dissolve thoroughly. Then, the mixture can be poured into a quartz cuvette (1×1×4 cm). The mixture solidifies upon heat treatment of 60° C. for 4 h and cools to room temperature kept for 20 h. This solid bar of dimensions 1×1×3.8 cm (approx.) forms the solid active media (SAM) as shown in FIG. 4B.

In an embodiment, a pump laser can generate an initial light beam (UV or blue, pico or nanosecond), which is then focused by a lens into an excitation light beam.

In another embodiment, both liquid active media (LAM) and solid active media (SAM) can be fitted into the focal point of the input beam, and the active media (AM) can be fitted and removed using a plug and play mechanism. In this regard, the active media (AM) can be placed between two optical elements perpendicular to the pump, one being a partially reflecting plane mirror, and the other being a fully reflective mirror for liquid AM and random laser broadband mode or reflective grating for single wavelength RL mode.

Figure 2:
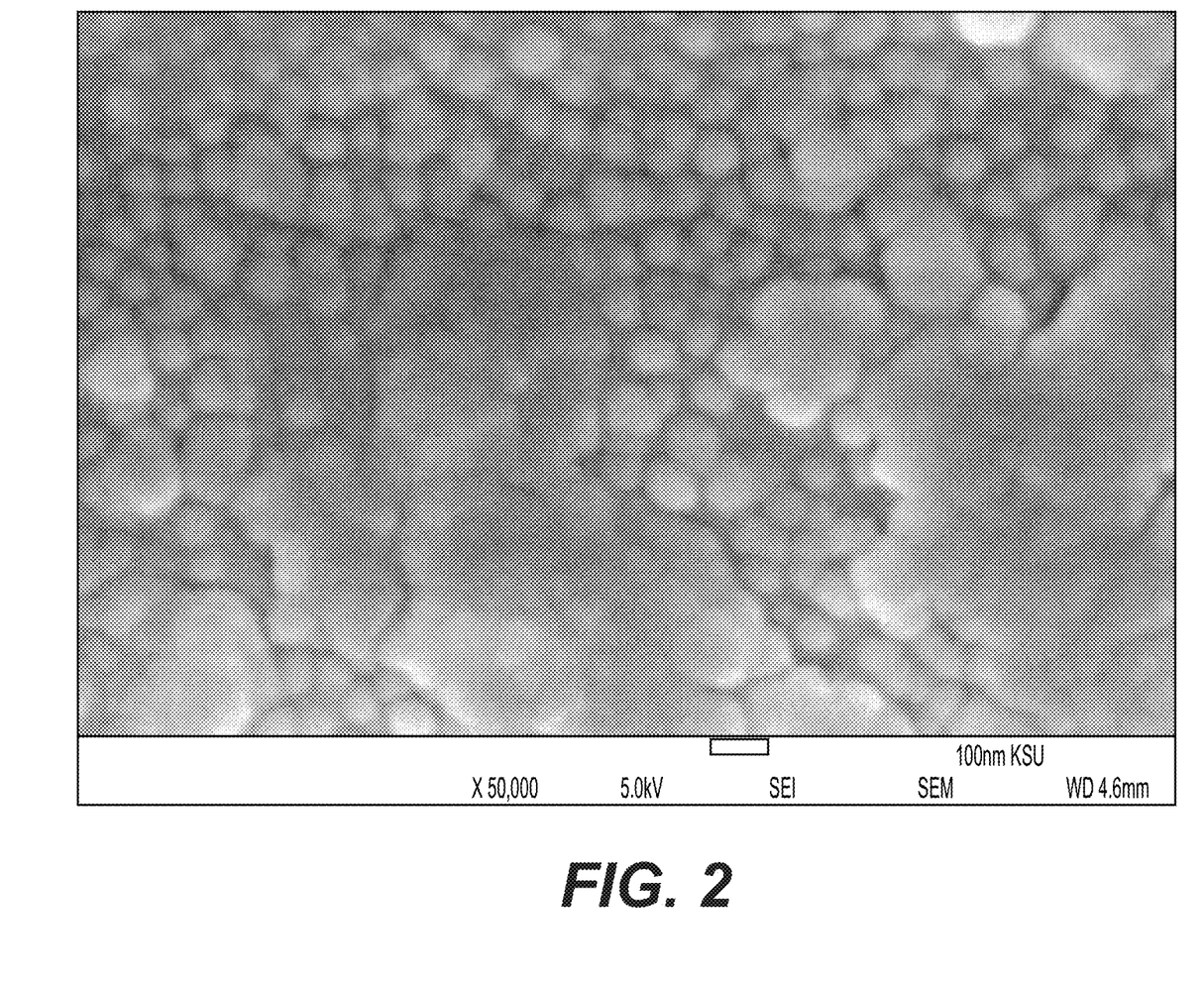
FIG. 2 is an FESEM of Cl-PD/MeO-PD in a PCL solid-state matrix.
Figure 5A:
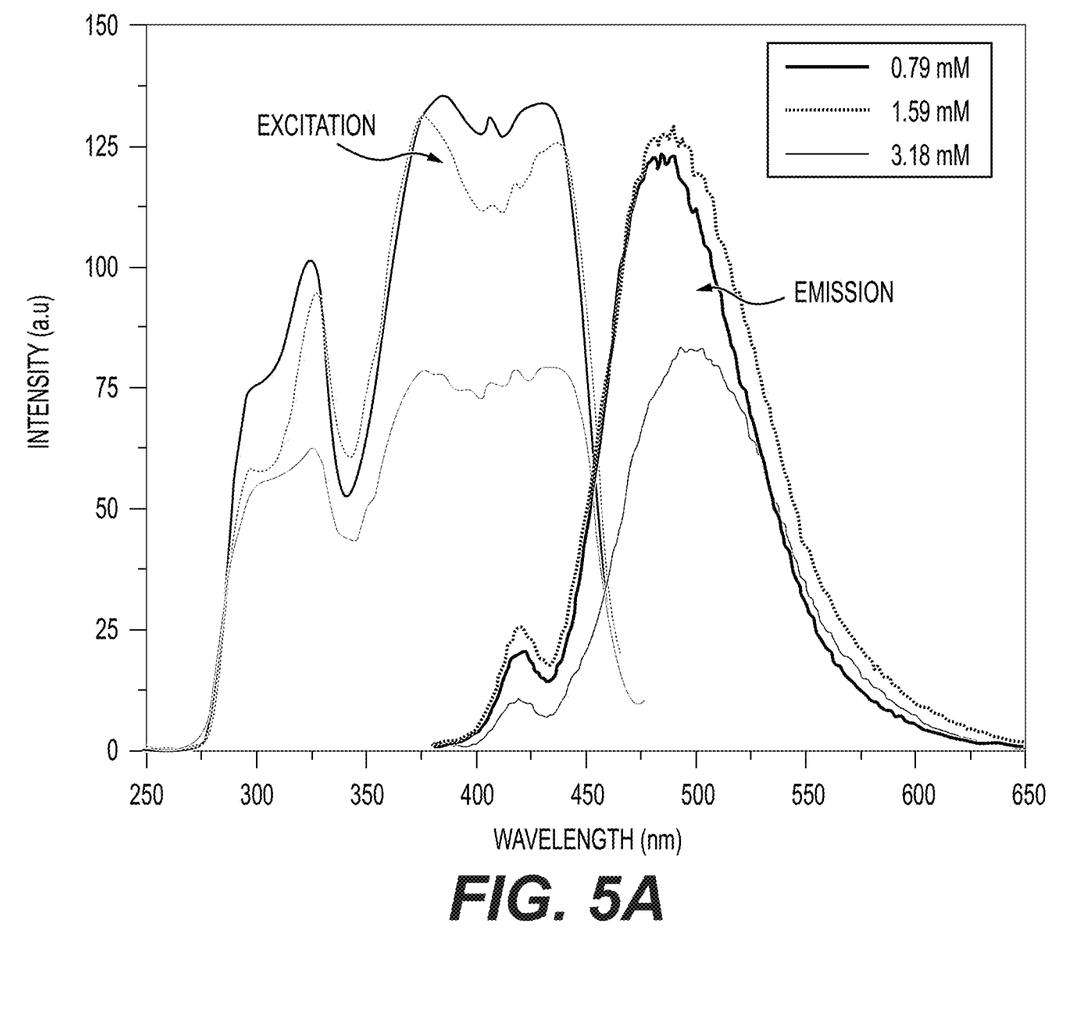
FIG. 5A is a chart showing Excitation and Emission of MeO-PD.
Figure 5B:
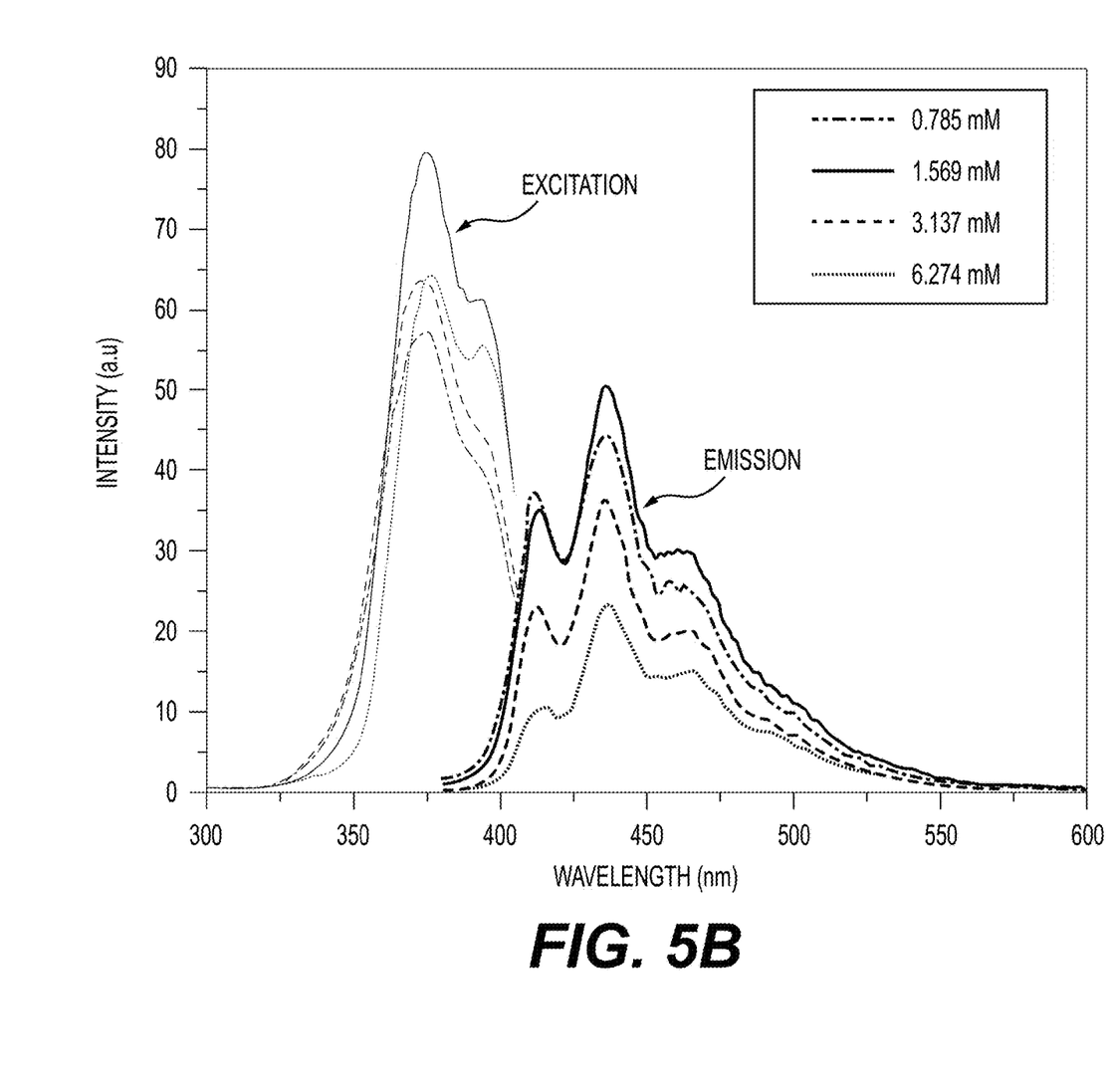
FIG. 5B is a chart showing Excitation and Emission of Cl-PD.
Figure 5C:
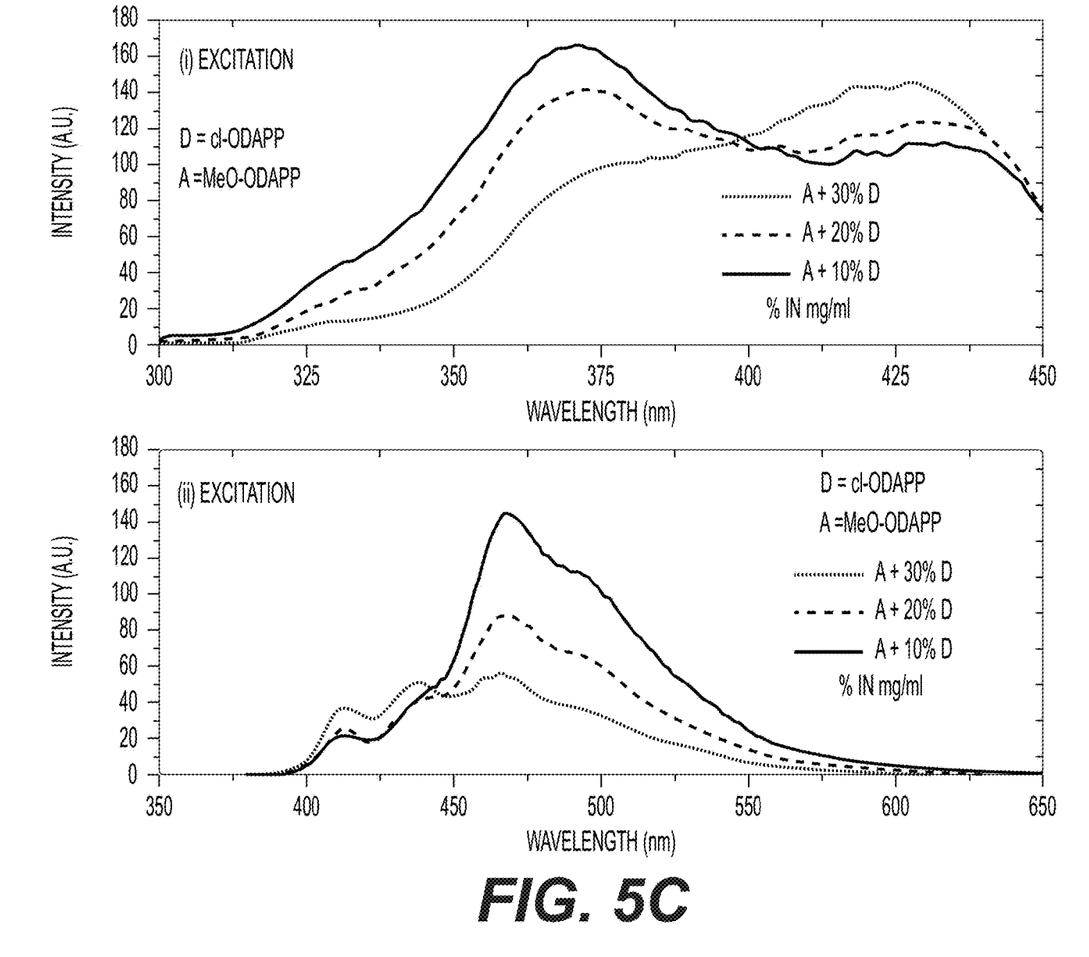
FIG. 5C provides charts showing Excitation and Emission of solution mixtures containing Cl-ODAPP (donor) and MeO-PD (acceptor).
Figure 5D:
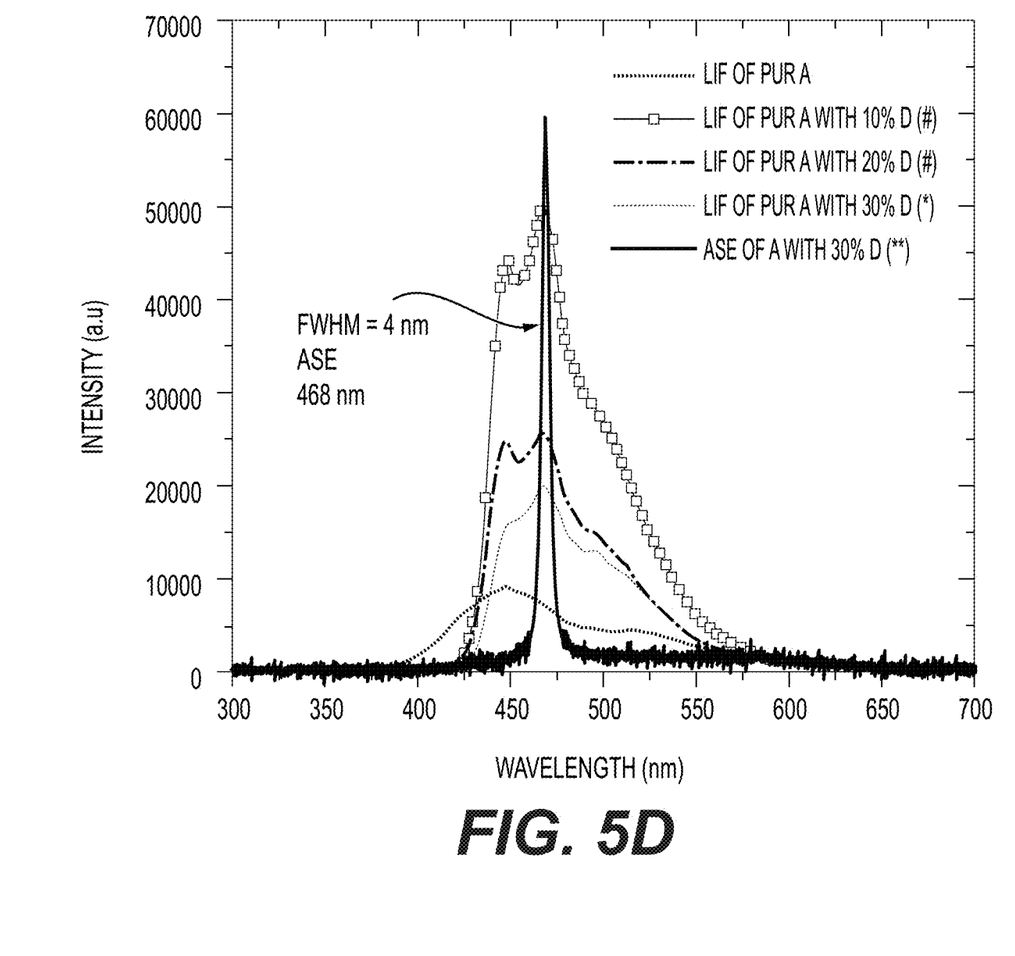
FIG. 5D is a chart showing Laser Induced Fluorescence (LIF) and Amplified Spontaneous Emission (ASE) from a solution mixture containing Cl-ODAPP (donor) and MeO-PD (acceptor).
Figure 5E:
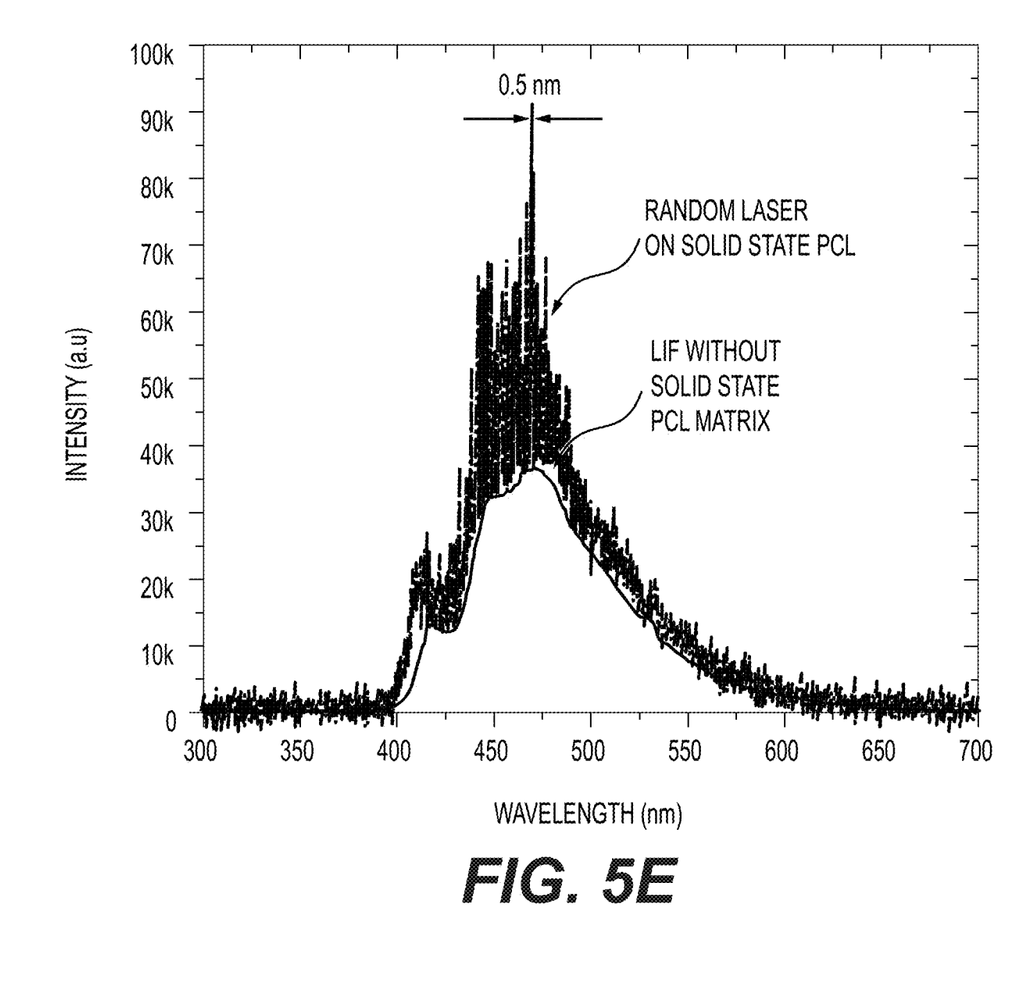
FIG. 5E is a chart showing Laser Induced Fluorescence (LIF) and random laser (RL) from Cl-PD (donor) and MeO-PD (acceptor) in a polycaprolactone (PCL) solid-state matrix (SSM).

In an embodiment, the RL can originate from the nano-sized sphere of PCL that is embedded with a Cl-PD/MeO-PD blend on its surface. As shown in FESEM FIG. 2, each ball can act as a gain loop, but the pathlength is inherently random, so numerous wavelengths are amplified and produce the RL as shown in FIG. 5E. In FIG. 5E, the random laser (RL) on solid state (SS) polycaprolactone (PCL) has a pump energy of 31 mJ, and the laser induced fluorescence (LIF) without solid state PCL matrix has a pump energy of 6 mJ.

Figure 3:
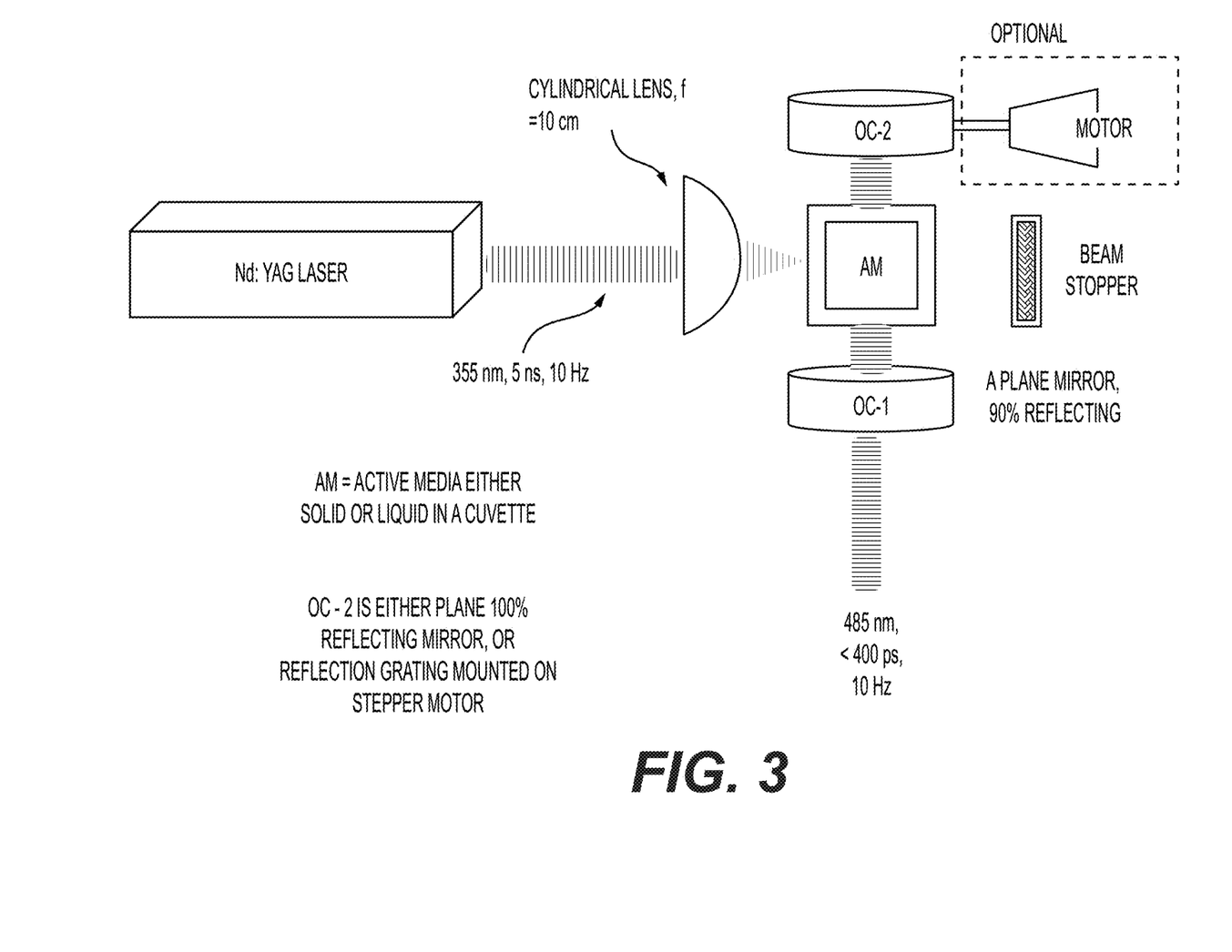
FIG. 3 is a schematic of a laser design (variable to liquid and solid-state AM), using Cl-ODAPP (D) and MeO-ODAPP (A) in a PCL solid state matrix.

The basic laser design is given in FIG. 3; the structural elements comprise a cylindrical lens at the inlet of the laser pump pulse. Active media (AM) is placed at focal plane at f=5 cm of the cylindrical lens. Two optical components can be placed perpendicular to the pump pulse. The optical cavity mirror (OC-1) can be an about 90% reflective mirror and can have a fixed value for all designs (unless mentioned otherwise). In some designs, OC-1 is completely removed. The OC-2 can be an about 100% reflective mirror or highly reflective holographic grating (about 1000 lines per cm) depending on whether liquid or solid AM is used, respectively. A non-limiting exemplary set-up of mirrorless SAM mode is given in FIG. 4A, and FIG. 4B shows the solid media after pumping about 35000 shots with about 30 mJ of energy each. FIG. 5A displays the excitation and emission spectra of MeO-ODAPP utilized as an acceptor (A) at various concentrations as indicated in the figure legend. FIG. 5B depicts the excitation and emission spectra of Cl-ODAPP used as a donor (D) at different concentrations as specified in the figure legend.

In one embodiment, the liquid AM (LAM) can use an about 100% reflecting mirror, as Design Variant.1 (DV1). In another embodiment, the solid AM (SAM) can use a highly reflective holographic grating (about 1000 lines per cm) that is mounted on a rotating stage attached to stepper motor, as Design Variant.2 (DV2). In DV1, if the LAM is replaced with a SAM, it can form Design Variant.3 (DV3).

The DV1 can produce an amplified spontaneous emission (ASE) if the OC-1 is removed, thereby forming Design Variant.4 (DV4), which can be considered to be a subvariant of DV1. DV3 can produce ASE with a FWHM of about 4 nm for a threshold pump energy of about 20 mJ/cm$^2$ and can produce ASE with FWHM of up to about 2 nm at higher pump energies. It can have a peak wavelength at about 468 nm as shown in FIG. 5D, with an ASE efficiency of up to about 10% (about 200 µJ/cm$^2$). In contrast, DV1 can give a laser output with a FWHM of about 1.2 nm from the threshold of about 15 mJ/cm$^2$.

DV3 can produce a broadband LIF with random but sharp and intense spikes from about 425 nm to about 475 nm as shown in FIG. 5E. Each spike can have a FWHM≤about 0.4 nm. For pump energies less than threshold, it can produce an LIF, and pump energies above the threshold (≥about 30 mJ/cm$^2$) can produce a random laser (RL). The light output can have a conversion efficiency of about 15%.

DV2 can produce a tunable laser with a tunability range from about 425 nm to about 475 nm, depending on the angle of HRG from about 30° to about 150° rotation using a stepper motor. The power output of a single spike can vary randomly from about 0.1% to about 0.5% efficiency, even for a constant pump energy.

Both configurations can produce a picosecond pulse, even though the pump laser is a nanosecond laser. The AM—both LAM and SAM—can be replaced after the lifetime of each AM using a plug and play position locking mechanism. The SAM can have a lifetime of about 50000 shots and the LAM can have a lifetime of about 30000 shots before losing about 30% of its efficiency, which can be considered as the life of the AM.

Individually, MeO-ODAPP has a better (broader) excitation spectrum and reasonable emission spectra in toluene, as shown in FIG. 5A, and Cl-ODAPP has an excellent emission and narrower excitation, as shown in FIG. 5B. When blended together, the two compounds can produce 5 times more emissions, as shown in FIG. 5C. The resulting emission spectra are red and blue-shifted with respect to Cl-ODAPP and MeO-ODAPP, respectively. The enhancement of emission results in the production of ASE; this is possibly due to the band gap modification and FRET energy transfer from Cl-ODAPP to MeO-ODAPP. Without energy transfer, the individual compounds do not produce ASE, but when blended due to energy transfer (ET) they produce ASE, thus enabling the design of the laser.

In an embodiment, the present subject matter relates to organic 7H-pyrano[2,3-b:4,5-b']diquinoline derivative compounds selected from the group consisting of 10-chloro-7H-pyrano[2,3-b:4,5-b']diquinoline [(Cl-PD)] and 10-methoxy-7H-pyrano[2,3-b:4,5-b']diquinoline [(MeO-PD)] having the following structures, respectively.

In an embodiment, the present subject matter relates to a method of synthesizing organic 7H-pyrano[2,3-b:4,5-b']diquinoline derivative compounds, the method comprising: adding 2-hydroxyquinoline-3-carbaldehyde to propargyl bromide in the presence of sodium hydroxide in n-propanol to produce 2-(prop-2-yn-1-yloxy)quinoline-3-carbaldehyde; reacting the 2-(prop-2-yn-1-yloxy)quinoline-3-carbaldehyde with an arylimine in CH$_2$Cl$_2$ to produce a corresponding 2-(prop-2-yn-1-yloxy)quinolin-3-arylimine; and treating the corresponding 2-(prop-2-yn-1-yloxy)quinolin-3-arylimine with about 20 mol % of boron trifluoride diethyl etherate (BF$_3$O(C$_2$H$_5$)$_2$) in 1,2-dichloroethane to produce the organic 7H-pyrano[2,3-b:4,5-b']diquinoline derivative compounds. Said derivatives can then be used as active media in the liquid and solid-state laser system.

EXAMPLES

Example 1

Regarding the method of synthesizing the organic 7H-pyrano[2,3-b:4,5-b']diquinoline derivatives, the prerequisite starting substrates (E)-N-benzylidene-2-(prop-2-yn-1-yloxy)quinolin-3-amines 5a-b, were synthesized from 2-hydroxyquinoline-3-carbaldehyde 1 in two steps as described in the following Scheme 1.

Scheme 1. Synthesis of 7H-pyrano[2,3-b:4,5-b'] diquinolines, 6a-b

2-hydroxyquinoline-3-carbaldehyde 1 was added to propargyl bromide 2 and O-propargylated in the presence of sodium hydroxide in n-propanol to afford 2-(prop-2-yn-1-yloxy)quinoline-3-carbaldehyde 3 in good yields. The quinoline carbaldehyde 3 was treated with arylimines 4a-b in $CH_2Cl_2$ for 30 min to produce the corresponding quinoline arylimines 5a-b in excellent yield (89-95%). Thus, an equimolar mixture of propargylated quinoline carbaldehyde 3 and various substituted arylimines 4a-b in dry $CH_2Cl_2$ were stirred for 30 min at room temperature. After completion of the reaction as evidenced by TLC analysis, the solvent was removed under reduced pressure. The crude material was washed with diethyl ether to afford the pure corresponding 2-(prop-2-yn-1-yloxy)quinolin-3-arylimine 5a-b.

With the 2-(prop-2-yn-1-yloxy)quinolin-3-arylimine 5a-b, the construction of the target framework by employing an intramolecular Povarov reaction was initiated. The reaction was carried out using equimolar amounts of O-propargyl quinoline carbaldehyde 3 and the suitable substituted arylamines 4a-b (i) under catalyst-free conditions and (ii) in the presence of catalysts such as $InBr_3$, $Yb(OTf)_3$, $InCl_3$ and ceric ammonium nitrate (CAN) in various solvents such as $CH_3CN$, $CH_2Cl_2$, $C_2H_4Cl_2$ at ambient temperature. Under all the above-mentioned conditions, an inseparable mixture of products was obtained, even after prolonged reaction times (24-72 hrs). The reaction in $CH_3CN$ at 80° C. did not progress to the final product, and the formation of uncharacterizable impurities was observed. No improvements were observed when the same reaction was performed in the presence of molecular sieves under an inert atmosphere. However, when the isolated quinoline arylimines 5a-b were treated with 20 mol % of boron trifluoride diethyl etherate, $BF_3 \cdot O(C_2H_5)_2$, in 1,2-dichloroethane at 80° C., the desired pyranoquinolines 6a-b were obtained (Scheme 1). The synthesized compounds 6a-b were unambiguously determined by spectroscopic analysis.

It is to be understood that the present subject matter is not limited to the embodiments described above but encompasses any and all embodiments within the scope of the following claims.

We claim:

1. 7H-Pyrano[2,3-b:4,5-b']diquinoline derivative compounds selected from the group consisting of 10-chloro-7H-pyrano[2,3-17:4,5-b']diquinoline [(Cl-PD)] and 10-methoxy-7H-pyrano[2,3-b:4,5-b']diquinoline [(MeO-PD)] having the following structures, respectively:

2. A method of synthesizing organic 7H-pyrano[2,3-b:4,5-b']diquinoline derivative compounds, the method comprising:

adding 2-hydroxyquinoline-3-carbaldehyde to propargyl bromide in the presence of sodium hydroxide in n-propanol to produce 2-(prop-2-yn-1-yloxy)quinoline-3-carbaldehyde;

reacting the 2-(prop-2-yn-1-yloxy)quinoline-3-carbaldehyde with an arylimine in $CH_2Cl_2$ to produce a corresponding 2-(prop-2-yn-1-yloxy)quinolin-3-arylimine; and treating the corresponding 2-(prop-2-yn-1-yloxy)quinolin-3-arylimine with about 20 mol % of boron trifluoride diethyl etherate $(BF_3O(C_2H_5)_2)$ in 1,2-dichloroethane to produce the organic 7H-pyrano[2,3-17:4,5-b']diquinoline derivative compounds.

3. The method of claim 2, wherein the organic 7H-pyrano[2,3-b:4,5-b']diquinoline derivative compounds are Cl-PD and MeO-PD having the following structures, respectively:

4. The method of claim 2, wherein an equimolar mixture of the 2-(prop-2-yn-1-yloxy)quinoline-3-carbaldehyde and arylimine in $CH_2Cl_2$ was stirred for 30 min at room temperature; and after completion of the reaction, the $CH_2Cl_2$ was removed under reduced pressure and crude material was washed with diethyl ether to afford the 2-(prop-2-yn-1-yloxy)quinolin-3-arylimine.

5. The method of claim 3, wherein the 2-(prop-2-yn-1-yloxy)quinolin-3-arylimine is treated with the boron trifluoride diethyl etherate in the 1,2-dichloroethane at 80° C. to produce the 7H-pyrano[2,3-b:4,5-b']diquinoline derivatives Cl-PD and MeO-PD.

6. A liquid and solid-state laser system comprising a laser structure and organic pyranodiquinoline derivatives 10-methoxy-7H-pyrano[2,3-b:4,5-b']diquinoline [(MeO-PD)] and 10-chloro-7H-pyrano[2,3-b:4,5-b']diquinoline [(Cl-PD)] employed in an energy transfer mechanism.

\* \* \* \* \*